(12) United States Patent
Younger

(10) Patent No.: US 11,455,586 B2
(45) Date of Patent: Sep. 27, 2022

(54) SYSTEM AND METHOD FOR IDENTIFICATION, ASSESSMENT, AND MANAGEMENT OF BUSINESS VALUATION AND BUSINESS RISK

(71) Applicant: Copilot Advisory Services, LLC, Denver, CO (US)

(72) Inventor: Christopher Jon Younger, Cherry Hills Village, CO (US)

(73) Assignee: Class VI Partners, LLC, Denver, CO (US)

( * ) Notice: Subject to any disclaimer, the term of this patent is extended or adjusted under 35 U.S.C. 154(b) by 0 days.

(21) Appl. No.: 16/814,838

(22) Filed: Mar. 10, 2020

(65) Prior Publication Data

US 2020/0293961 A1      Sep. 17, 2020

Related U.S. Application Data

(60) Provisional application No. 62/819,465, filed on Mar. 15, 2019.

(51) Int. Cl.
*G06Q 10/06* (2012.01)
*G06Q 30/02* (2012.01)

(52) U.S. Cl.
CPC ... *G06Q 10/0635* (2013.01); *G06Q 10/06393* (2013.01); *G06Q 30/0203* (2013.01); *G06Q 30/0283* (2013.01)

(58) Field of Classification Search
None
See application file for complete search history.

(56) References Cited

U.S. PATENT DOCUMENTS 6,859,785 B2   2/2005 Case
8,135,638 B2   3/2012 Gopfert
(Continued)

FOREIGN PATENT DOCUMENTS

CN      109190954 A  *  1/2019
WO   WO 2015/094545      6/2015

OTHER PUBLICATIONS

Smolarski, Jan, et al. "Risk management in Indian venture capital and private equity firms: A comparative study." Thunderbird International Business Review 47.4 (2005): 469-488. (Year: 2005).*

(Continued)

*Primary Examiner* — Thomas L Mansfield
(74) *Attorney, Agent, or Firm* — Critical Path IP Law, LLC

(57) ABSTRACT

Systems and methods to identify, assess, and manage business risk and increase business valuation and marketability are provided. In one aspect, business risk is determined in response to user responses to a set of business queries. In one embodiment, a method to mitigate business risk includes receiving company data and a set of user-provided answers to a set of business queries, each of the set of user-provided answers having a weighted value and a prioritized ranking value; categorizing the set of user-provided answers into a set of response categories; generating a score for each response category; dividing the set of business queries into two business categories; calculating a set of score weight values for each user-provided answer; and calculating a total score weight for each business category; and generating a risk prioritization list along with tactics to address such risks.

20 Claims, 10 Drawing Sheets

(56) References Cited

U.S. PATENT DOCUMENTS

| | | | |
|---|---|---|---|
| 8,200,527 B1* | 6/2012 | Thompson | G06Q 10/06398 705/7.39 |
| 8,265,981 B2 | 9/2012 | Ficery | |
| 8,311,873 B2 | 11/2012 | Dahl | |
| 8,606,616 B1 | 12/2013 | Crapsey, III | |
| 2002/0174000 A1* | 11/2002 | Katz | G06Q 10/10 705/7.26 |
| 2008/0046303 A1 | 2/2008 | Gordon | |
| 2014/0207527 A1 | 7/2014 | Garvey | |
| 2014/0324521 A1* | 10/2014 | Mun | G06Q 30/0201 705/7.28 |
| 2015/0095212 A1* | 4/2015 | Openlander | G06Q 40/025 705/38 |
| 2015/0286969 A1* | 10/2015 | Warner | G06Q 10/0633 705/7.27 |
| 2017/0132546 A1 | 5/2017 | Ray | |
| 2017/0220964 A1* | 8/2017 | Datta Ray | H04L 63/20 |

OTHER PUBLICATIONS

Wu, Desheng Dash, Shu-Heng Chen, and David L. Olson. "Business intelligence in risk management: Some recent progresses." Information Sciences 256 (2014): 1-7. (Year: 2014).*

Gatzert, Nadine, and Michael Martin. "Determinants and value of enterprise risk management: Empirical evidence from the literature." Risk Management and Insurance Review 18.1 (2015): 29-53. (Year: 2015).*

Segal, Sim. Corporate value of Enterprise risk management: the next step in business management. John Wiley & Sons, 2011. (Year: 2011).*

* cited by examiner

| Marketability Risks | Priority Ranking |
|---|---|
| First Right of Offer/Refusal Exists on Company Sale | 77 |
| Phase 1 Revealed Waste Not Remediated | 67 |
| Company/Shareholder(s) involved in lawsuit | 56 |
| Management Would not Pass Background Check | 42 |

| Price Predictor Risks | Priority Ranking |
|---|---|
| Gross Margins are Too Low | 64 |
| Undefined Growth Strategy | 61 |
| Most Favored Nations Clause Exists in Contract(s) | 52 |
| Project Concentration Too High | 51 |
| Company's Products are Too Customized to Scale | 50 |
| Most Documents are Not Electronic | 29 |

Figure 6A

| Module 812 | Submodule 813 | Question 814 | Value/Price (P) or Marketability (M) 815 | Risk Name 816 | Trigger White Paper &/or Explanation 817 | -2 Pts | -1 pt | Neutral | +1 Pt | +2 Pts | Weight 830 | Weighting Decile 832 | Max Neg | Max Pos | Range - Min | Max 840 |
|---|---|---|---|---|---|---|---|---|---|---|---|---|---|---|---|---|
| Market | US Market | What is the size of your target market in the US overall? | P | Market size too small | <$50M; $50M - $250M; $250M-1B OR Do Not Know | <$50 M | $50M - $250 M | $250M-1B OR Do Not Know | >$1B | | a | b | c | d | e | f |
| Market | US Market | Is your market in the US growing, shrinking, or flat? | P | Market growing too slowly or shrinking | shrinking; flat | | Shrinking | flat | Growing | | g | h | i | j | k | l |
| | | ... | | | | | | | | | | | | | | |

*Note: Symbols in practice are numerical values*

Figure 8A

SYSTEM AND METHOD FOR IDENTIFICATION, ASSESSMENT, AND MANAGEMENT OF BUSINESS VALUATION AND BUSINESS RISK

CROSS-REFERENCE TO RELATED APPLICATION

This application is a nonprovisional patent application of and claims the benefit of U.S. Provisional Patent Application No. 62/819,465, filed Mar. 15, 2019 and titled "System and Method for Identification, Assessment, and Management of Business Valuation and Business Risk," the disclosure of which is hereby incorporated herein by reference in its entirety.

FIELD

The disclosure relates generally to systems and methods involving business risk assessment and corresponding impact on business valuation, and specifically to systems and methods to identify, assess, and manage business risk to increase business valuation.

BACKGROUND

The level of perceived risk in a business has a significant impact on the overall valuation of that business. Business risk is typically assessed to, among other things, determine the appropriate valuation of a business. Business valuation is most commonly associated with preparing for the sale of a business or a capital raise.

Conventional approaches to determining business risk and business valuation are labor intensive, provide inconsistent results, and are of varied fidelity. The disclosure provides systems and methods to analyze and determine business risk and its impact on business valuation using a semi-automated process, as enabled by user responses to a set of business queries and/or business data input.

Among other things, the systems and methods of the disclosure provide a user, such as a business owner, with: the specific factors that are helping or hurting value in the user's company, the relative importance of these different factors, why these factors are important, potential solutions to address these factors, an indicative valuation range for the company as compared to industry peers, and an assessment of whether there are specific risks that would make the company less marketable.

The disclosed system gathers information from a business owner or other empowered user via a detailed survey divided into different modules (e.g. Financial, Organizational, Customer, Employee, Strategic, Market and Growth). The system then scores the answers and provides an overall assessment of a company's readiness to go to market to raise capital or to sell as well as an explanation of which factors are adversely or positively impacting business valuation.

Specific risk factors are prioritized that are negatively impacting value based on their overall impact on value, the expected cost to address that specific risk factor, the likelihood of success in being able to address that specific risk factor, and the potential damage to the business if the effort to address the risk factor fails. From this prioritization of risk factors, the system provides an explanation of each of the risk factors and why they are important to investors. Also, the system develops a custom-built list of potential actions to resolve each specific risk to help mitigate those risks and to increase value. By following this curriculum and executing these tasks, it is expected that the user will drive a significant increase in value for their business and make it more marketable.

After completing the initial system assessment, a user may input up to three years of basic financial information to get an indicative range of value their company might be worth in a competitive market that would be based on comparable transactions in their industry and incorporate the results from using the system's survey information. In addition, provided the user inputs annual financial information, the system will utilize available benchmarking data to generate an annual benchmarking report which compares the user's company to companies in their industry as well as to middle market companies as a whole, highlighting specific areas that the user should address to drive more value for their company.

Also, if a user opts in, a profile of the user's company may be provided to investors who focus on investing in the user company's industry. These investors would pay to have access to participating user companies and would be able to view information specifically authorized by the user in order to ascertain their potential interest in investing in the user's company.

The embodiments of the disclosure have application beyond systems and methods to identify, assess, and manage business risk to, for example, increase business or company valuation. For example, without limitation, the systems and methods of the disclosure may be applied for personal financial planning; in one embodiment, the system may assist a user with determining how ready the owner is to sell a company, the maturity or appropriateness of estate planning, financial planning, tax planning, and/or liability planning.

SUMMARY

Generally, systems and methods involving business risk assessment and corresponding impact on business valuation are disclosed. In one embodiment, the systems and methods are applied to identify, assess, and manage business risk to increase business valuation. For example, various methods and systems are disclosed which determine or calculate a business risk metric or set of metrics, the business risk metric(s) useful to manage business risk and/or to assess or measure business valuation.

In one embodiment, a method to generate a business metric is disclosed, the method comprising: receiving a set of company data; receiving a set of user-provided answers to a set of business queries, each of the set of user-provided answers having a weighted value and a prioritized ranking value; categorizing the set of user-provided answers into a set of response categories; generating a score for each response category; dividing the set of business queries into two business categories; calculating a set of score weight values for each user-provided answer; calculating a total score weight for each business category; and generating a business metric, wherein the business metric is a risk prioritization list.

In one aspect, the method further comprises generating a risk explanation associated with at least one query of the set of business queries. In another aspect, the method further comprises generating a list of potential fixes to a risk factor associated with at least one query of the set of business queries. In another aspect, the method further comprises providing a software tool associated with the risk factor. In another aspect, the set of company data comprises revenue data, gross margin data, and EBITDA data. In another aspect, the set of business queries comprises business queries associated with geographic markets, cyclicality, manufacturing, owner dependence, products-services, depth-quality, unionization, market position and other related queries. In another aspect, the two business categories are value-price and marketability. In another aspect, the set of set of response categories are five response categories. In another aspect, the method further comprises presenting a risk quadrant to a user, the risk quadrant associated with the set of user-provided answers to a set of business queries. In another aspect, the method further comprises generating a price predictor graph associated with the set of user-provided answers to a set of business queries. In another aspect, the method further comprises categorizing the set of business queries into a set of query modules, wherein the set of query modules are seven query modules comprising a financial module, an organizational module, a customer module, an employee module, a strategic module, a market module, and a growth module.

In another embodiment, a system to generate a business metric is disclosed, the system comprising: a user interface module configured to receive a set of company data and to receive a set of user-provided answers to a set of business queries, each of the set of user-provided answers having a weighted value and a prioritized ranking value; and a logic engine operating to: categorize the set of business queries into a set of response categories; generate a score for each response category; divide the set of business queries into two business categories; calculate a set of score weight values for each user-provided answer; calculate a total score weight for each business category; and generate a business metric, wherein the business metric is a risk prioritization list.

In one aspect, the logic engine further operates to generate a list of potential fixes to a risk factor associated with at least one query of the set of business queries. In one aspect, the set of company data comprises revenue data, gross margin data, and EBITDA data. In one aspect, the set of business queries comprises business queries associated with geographic markets, cyclicality, manufacturing, owner dependence, products-services, depth-quality, unionization, market position, and other related queries. In one aspect, the two business categories are value-price and marketability. In one aspect, the set of set of response categories are five response categories. In one aspect, the logic engine is further configured to present a risk quadrant to a user, the risk quadrant associated with the set of user-provided answers to a set of business queries. In one aspect, the system is further configured to categorize the set of business queries into a set of seven query modules comprising a financial module, an organizational module, a customer module, an employee module, a strategic module, a market module, and a growth module.

In yet another embodiment, a method of determining a business risk metric is disclosed, the method comprising: receiving a set of company data comprising revenue data, gross margin data, and EBITDA data; receiving a set of user-provided answers to a set of business queries, each of the user-provided answers having a weighted value and a prioritized ranking value, and each of the user-provided answers corresponding to a set of answer tranches, each answer tranche having a numerical value; categorizing the set of user-provided answers into a set of response categories; generating a score for each response category based at least in part on the numerical values; dividing the set of business queries into two business categories, the two business categories being value-price and marketability; calculating a set of score weight values for each user-provided answer, the set of score weight values based at least in part on the numerical values; calculating a total score weight for each business category; and generating the business risk metric, wherein the business risk metric is a risk prioritization list; wherein: the set of answer tranches is at least five answer tranches.

The phrase "business risk" or the word "risk" means the possibility that a business will not perform as planned or expected, for example the possibility that a business valuation may be lower than estimated.

The phrase "business valuation" or the word "valuation" means a determination of the monetary worth of a business, either as current worth or projected worth.

The word "app" or "application" means a software program that runs as or is hosted by a computer, typically on a portable computer, and includes a software program that accesses web-based tools, APIs and/or data.

The phrase "cloud computing" or the word "cloud" refers to computing services performed by shared pools of computer resources, often over the Internet.

The phrase "user interface" or "UI", and the phrase "graphical user interface" or "GUI", means a computer-based display that allows interaction with a user with aid of images or graphics. The phrase "data sources" means a collection of accessible data that is accessed at a known location, to include physical locations such as a physical database and a virtual location, such as on a computing or storage cloud. Also, the term "database" is not limited to a physical database, and may, for example, define a broader data source By way of providing additional background, context, and to further satisfy the written description requirements of 35 U.S.C. § 112, the following references are incorporated by reference in their entireties: U.S. Pat. No. 6,859,785 to Case; U.S. Pat. No. 8,135,638 to Gopfert; U.S. Pat. No. 8,311,873 to Dahl; U.S. Pat. No. 8,606,616 to Crapsey III; and U.S. Pat. No. 8,265,981 to Ficery; U.S. Pat. Appl. Nos. 2017/0132546 to Ray; 2014/0207527 to Garvey; and 2008/0046303 to Gordon; and World IP Organization Publ. No. WIPO 2015/094545 to Mun. The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g. the calculation of metrics and/or scoring of user inputs or responses to system queries or questions. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 6A depicts a sample display of risk prioritization as provided to a user on the user interface of FIG. 1;

FIG. 8A is a data file associated with the user input element of the business risk and business valuation system of FIG. 1.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-8. Generally, systems and methods to identify, assess, and manage business risk and business valuation are disclosed.

Figure 1:
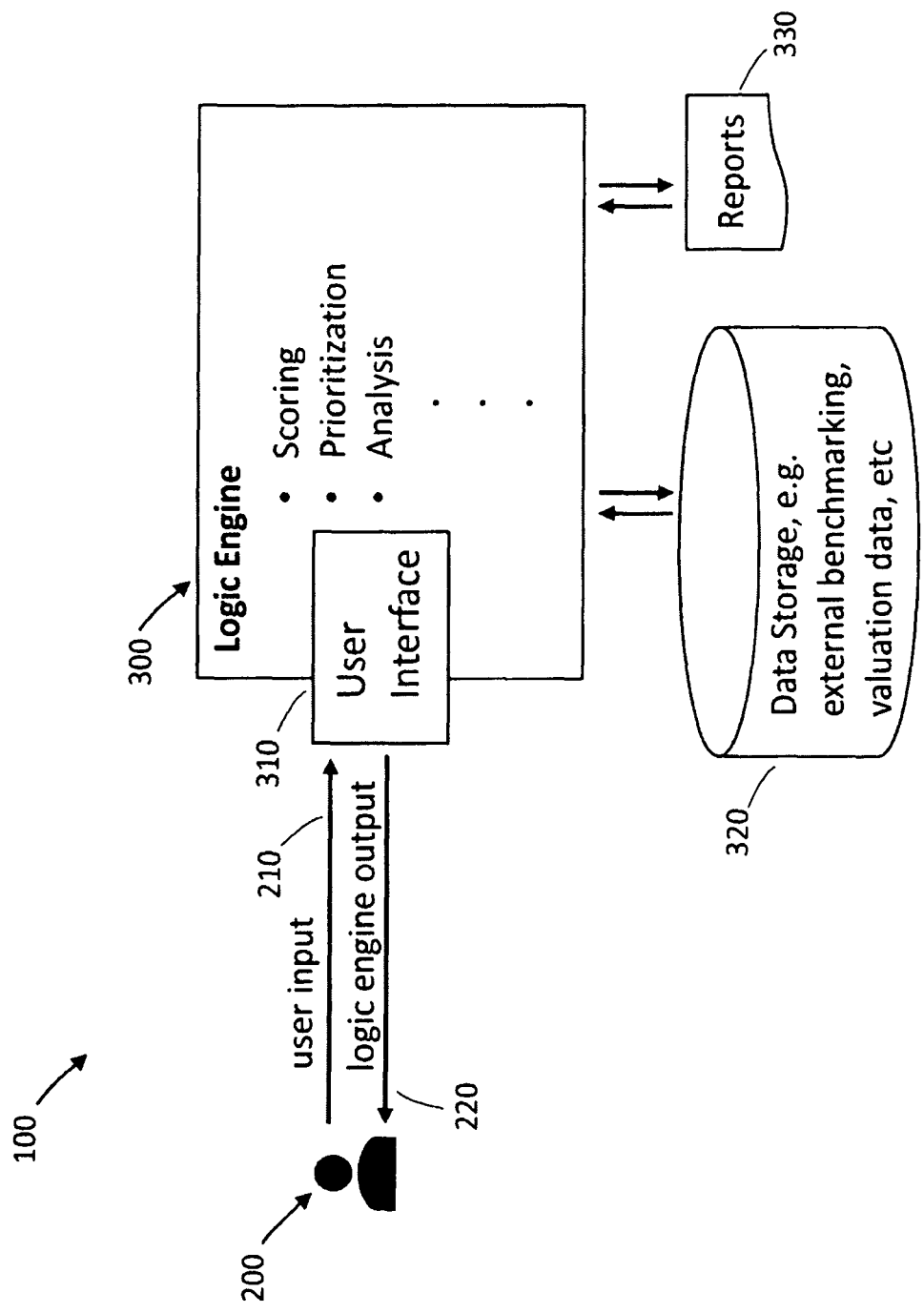
FIG. 1 is a schematic diagram of one embodiment of a business risk and business valuation system of the disclosure.

With attention to FIG. 1, a schematic diagram of one embodiment of a business risk and business valuation system 100 is depicted. The phrase "business risk and business valuation system" or "business risk assessment system" or simply the "system" refers to any of the embodiments of the disclosure which involve any collection of the features described in the disclosure and is not limiting. Similarly, the phrase "business risk and business valuation method" or simply the "method" refers to a method of use of the "business risk and business valuation system" and/or to any of the embodiments of the disclosure which involve any collection of the features described in the disclosure and is not limiting. For example, the business risk and business valuation system may provide measures or assessments or insights into the level of risk within a business and the impact of this level of risk on the valuation of a business.

Generally, a user 200 interacts with the system 100 by way of a user interface 310, the system 100 comprising a logic engine 300. The user interface 310 module is configured to receive a set of company data and to receive a set of user-provided answers to a set of business queries.

The logic engine 300 interacts or is in communication with a data storage 320 element and/or a reports 330 module. In some embodiments, the data storage 320 and/or reports 330 are absent or form an integrated portion of the logic engine 300. The data storage 320 element may contain reference data, such as external benchmarking data, valuation data, etc. (see, for example, description below with respect to FIG. 3 and elements 382 and 384 as to use of such data.) Generally, the system 100 provides a user 200 an objective assessment for what is driving value (up or down) in the subject business and a prescription for how to reduce risk in that business and consequently increase business value. The objective assessment provided by the system 100 to the user 200 may comprise one or more determined or calculated business metrics, such as a readiness business metric, a marketability business metric, a price prediction business metric, and a value/price business metric. The term "metric" means a measured value, e.g. a value/price business metric may be a financial value of a business in US dollars.

The user 200 may be a business owner, business executive and/or a business investor, for example. The user 200 provides user input 210 to the logic engine 300 by way of the user interface 310. The user 200 receives logic engine output 220 from the system 100 by way of the user interface 310. The user interface 310 may be a graphical user interface.

The user interface 310 may be physically distinct from the logic engine 300, and communicate by any of several means, such as by wireless communication. The user interface 310 may be provided by way of a portable computer device, such as a tablet, laptop, smart phone, and the like. The user interface 310 may be a software application, e.g. an "app" that is accessed by way of a portable device.

The data storage 320 element may be a physical database that is physically connected to the logic engine 300, or may be a remotely located database, such as located on the cloud or any means known to those skilled in the art. Similarly, all or some of the reports 330 may be located with or adjacent to the logic engine 300, and/or located with or adjacent the data storage 320 element, and/or may be located elsewhere, such as on the cloud, as known to those skilled in the art. In one embodiment, the user interface 310 may access one or both of the data storage 320 element and the reports 330 element. The logic engine 300 performs any of several functions, such as scoring, prioritization, and analysis of user input 210. The logic engine 300 may access additional, external data stored on the data storage 320 element to execute any of several functions. For example, the logic engine 300 may access financial data of peer companies of the subject business in order to provide reference valuation data to the user 200. Similarly, the logic engine 300 may access reports 330 module to access and provide reference report data (e.g. SEC filings, quarterly reports) of peer companies to the user 200.

Figure 2:
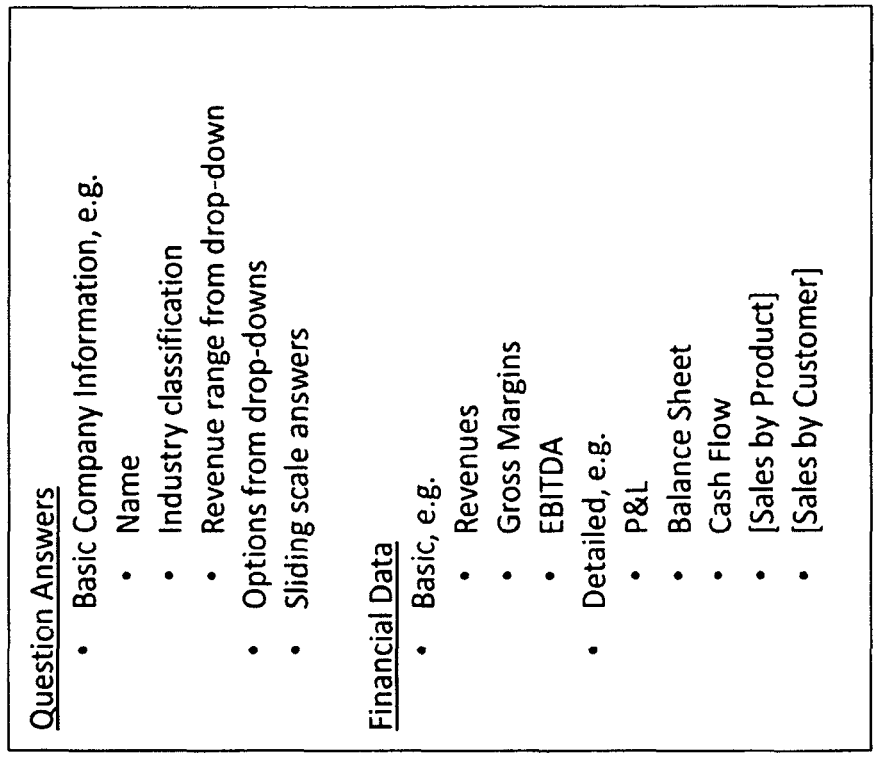
FIG. 2 is a detailed schematic diagram of the user input element of the business risk and business valuation system of FIG. 1.

FIG. 2 provides further details of the user input of the business risk assessment system 100 of FIG. 1. Generally, the user input 210 comprises user-provided answers to a set of business queries (identified as "Question Answers" in FIG. 2) and a set of company data (identified as "Financial Data" in FIG. 2). The user 200 provides or inputs the user input 210, as discussed above, through the user interface 310. The terms "questions" and "queries" are interchangeable and mean to elicit information or data.

The set of user-provided answers to the set business queries may include basic company data, such as industry classification, revenue range data, and the like. The set of user-provided answers to the set of business queries may require input of numerical values, finite options from pull down menus, and/or selection of values from a sliding scale.

The set of user-provided answers to the set business queries may also include financial data, such as revenues and gross margins over time (e.g. quarterly), EBITDA (i.e. earnings before interest, taxes, depreciation, and amortization), P&L (i.e. profit and loss) data, balance sheet data, cash flow, and the like.

In one embodiment, at least some of the questions are structured with if/then question dependencies. In one embodiment, at least some of the questions require the user responding to a question to select between a finite set of responses that are scored as −2, −1, 0, 1, and 2. In one embodiment, at least some of the questions result in bucketing of user responses into a finite set of responses that are scored as −2, −1, 0, 1, and 2. In one embodiment, the finite set of responses, and/or the finite set of bucketing of user responses, result in numerical values or points assigned to the respective responses, e.g. for a set of responses of −2, −1, 0, 1, and 2, a respective numerical values of −2 points, −1 points, 0 points, 1 point, and 2 points would is assigned.

In one embodiment, at least some of the user-provided answers to the set of business queries are provided in an automated manner, such as via the logic engine 300 communicating with one or both of the data storage 320 and the reports 330 modules. In one embodiment, at least some of the user-provided answers to the set of business queries are provided through interaction with a user-provided device, such as a networked external storage device. More description as to the character of the user-provided answers to the set of business queries is provided below with respect to FIG. 8A.

Figure 3:
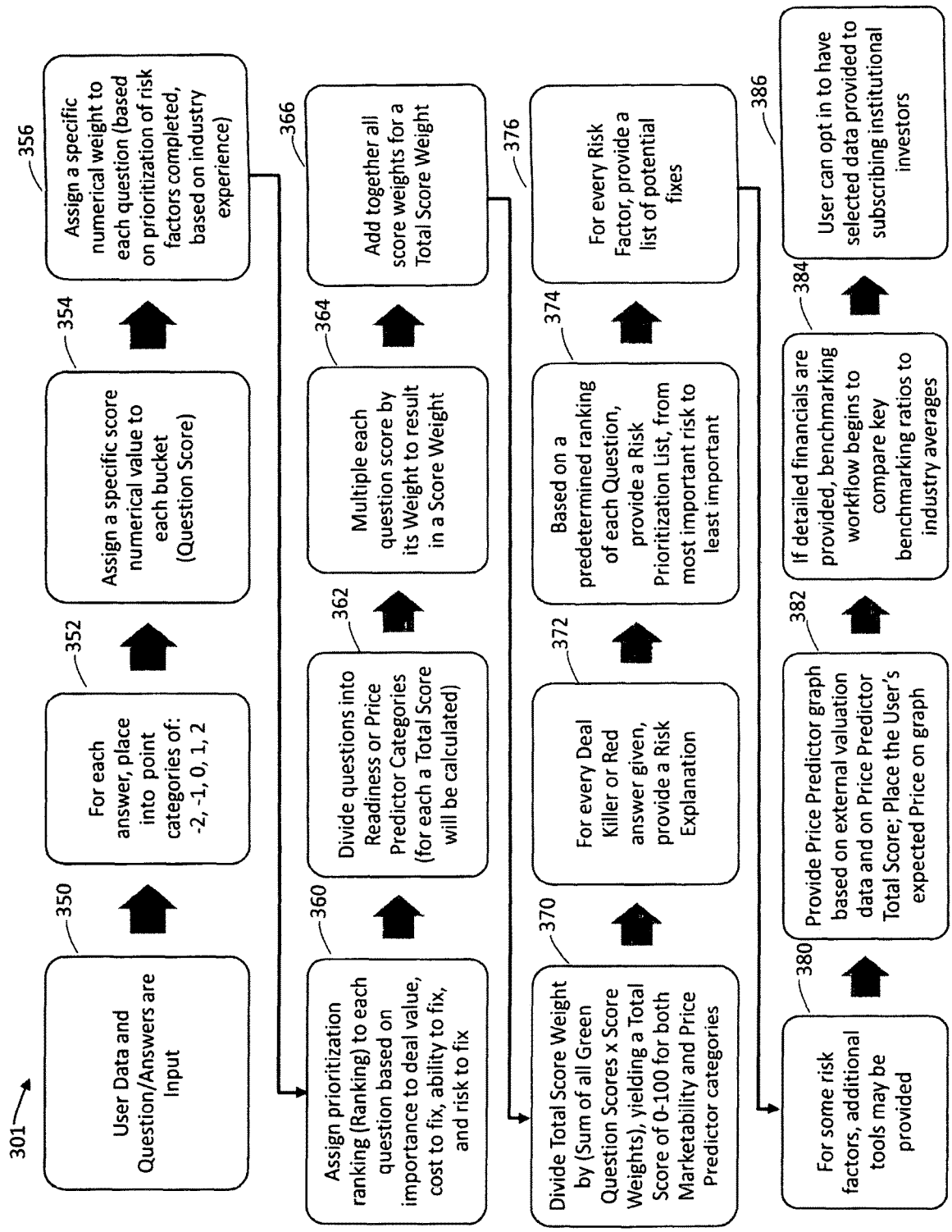
FIG. 3 is a flow diagram of one method of operation of the logic engine element of FIG. 1.

FIG. 3 provides further details of the logic engine 300 of the business risk and business valuation system 100 of FIG. 1. More specifically, FIG. 3 provides a flow diagram of the sequence of the functions of the logic engine 300. Note that in some embodiments, some functions (e.g. any of the identified elements numbered 350-386) may be absent, occur in a different order, or include other functions or steps not shown. Similarly, note that in some embodiments, some aspects or some elements of the logic engine 300 may be absent or be combined with aspects or elements not shown. For example, although shown in FIG. 1 as data storage element 320, an external database may not be present in all embodiments of the business risk and business valuation system. As discussed above, an external database may provide access to data used for financial benchmarking, valuation data of peer or other companies, etc.

Generally, the logic engine 300 is configured to: receive a set of company or business data; receive responses to a set of queries or questions, i.e. to receive a set of user-provided answers to a set of business queries; categorize the set of user-provided answers to a set of business queries into a set of response categories (the business queries as described above); associate a weighted value and/or a prioritized ranking value to at least some of the user-provided answers; generate a score for each response category; divide the set of business queries into business categories (for example, into two or more business categories); calculate a set of score weight values for each user-provided answer; calculate a total score weight for each business category; and generate a risk prioritization list. In one embodiment, the weighting of user responses to the business queries or questions is based on, or at least is influenced by, the impact of the response on the financial value of the business and/or the risk to the business. Other features and capabilities may be provided, as described below.

One output of the logic engine 300 is one or more business metrics, as briefly described above. Generally, one or both of a market readiness score and a set of price predictor scores are generated. The market readiness score or market readiness business metric reflects the ability of a company to go to market, to include most basically to even survive a process of preparing to go to market. The price predictor set of scores or set of price predictor business metrics may be based on or influenced by valuation metrics and/or user responses to quires related to valuation.

A logic engine sequence 301 depicted in FIG. 3B will now be described, with reference to the listing of the functions that the logic engine 300 module performs as presented in FIG. 3A.

At element 350, a user 200 inputs user-provided answers to questions and provides company data, as described above. At element 352, each answer is placed into a response category. The response categories serve to quantize the answers into buckets or tranches. In the embodiment described, the response categories are five in number and defined, in order from most negative (upon valuation and/or risk) to most positive as: −2 points, −1 point, 0 points, +1 point, and +2 points. In some embodiments, other than five (5) tranches are provided, e.g. three (3) tranches, four (4) tranches, six (6) tranches, etc. In one embodiment, the response categories are digitized tranches based on an analog (user input) measure, wherein a user manipulates a sliding bar along a set scale, which results in a digitized measure.

At element 354, each of the response categories is assigned a numerical value, and at element 356, each individual question is assigned a numerical weight aka a weighted value. The numerical weight assigned to each question may be a function of risk factor. More description of such calculations is provided below with respect to FIG. 4. More precisely, a question that relates to or is associated with a risk factor that is considered high risk will be assigned a higher numerical weight than a question that relates to or is associated with a risk that is considered of relatively lower risk. More description as to the relationship of questions and risk is provided below with respect to FIG. 8A. More description as to risk is provided below with respect to FIG. 8B.

At element 360, each individual identified risk is assigned a prioritized ranking value. The prioritized ranking value may be associated with any of several parameters. In the embodiment of FIG. 3, the prioritized ranking value is determined based on four criteria: importance to deal value, cost to fix, ability to fix, and risk to fix.

At element 362, each question is divided into a set of business categories. In the embodiment of FIG. 3A-B, the set of business categories are two in number, and are: readiness (aka marketability) and price predictor (aka value/price). At element 364, each question score (that is, each scored or valued answer to a particular question) is multiplied by the question's assigned numerical weight (as assigned at element 356) to result in a score weight value. All score weight values are then added together at element 366 to create a total score weight value.

A total score may be determined for each of the business categories; thus, in the embodiment described in FIG. 3 a total score is determined for each of readiness and price predictor. As described in element 370 of FIG. 3, each total score is determined by dividing the total score weight value (as determined at element 366) by the weighted sum of all green scores. Each total score (for each business category) ranges between 0 and 100. In some embodiments, any question or query that resulted in a response of not applicable aka n/a would be excluded from the calculation or determination of readiness and/or price predictor. Similarly, in some embodiments, any question or query that resulted in no user response would be excluded from the calculation or determination of readiness and/or price predictor.

At element 372, the user 200 is provided a risk explanation for any user-provided answer to a business query that resulted in a response category of −1 point or −2 points (or, more generally, any response category that resulted in negative points). The risk explanation may be provided to the user 200 by way of the user interface 310. In one embodiment, the risk explanation is a document accessible by the user, such as a white paper that describes why a risk is important to the market readiness business metric and/or to price predictor business metrics.

At element 374, a risk prioritization list is generated, the list presenting the risks (aka risk factors) from most important to least important. Such a list is depicted as FIG. 3B. In one embodiment, the risk prioritization aka the rank order of risk is determined or at least influenced by one or more of: a predetermined assessment of importance to value, ability to address the risk, cost to address the risk, and the risk of addressing the risk. In one embodiment, the user may override the risk prioritization list and re-order the risks based on their individual requirements and capabilities.

At element 376, a list of potential risk fixes is provided to the user for each risk. The potential fixes are specific to a particular risk factor. The list of potential fixes may be provided to the user 200 by way of the user interface 310. At element 380, for some risk factors, a software toot, e.g. an app, may be provided to assist the user in addressing or defining a particular risk.

Various displays, such as graphs, may be provided to the user 200 to understand, interpret, or otherwise interact with the results provided by the logic engine. Such displays may be presented to the user 200 by way of the user interface 310, to include by way of an app. For example, at element 382, a price predictor graph may be generated. In one embodiment, the price predictor graph presents external valuation data (e.g. based on peer company data) and presents the subject company's (i.e. the user's 200 company of interest) expected price (aka valuation) relative to the external validation data. The price predictor graph may be provided as a bell curve with positive and negative attributes, the curve using external valuation data to present the subject company's expected price (aka valuation) relative to the external validation data. A range of valuation for the subject company may thus be presented, the range of value illustrating both positive and negative attributes.

As another example, the price predictor bell curve may be generated or determined by extracting a value range from external data sources to establish the core (aka fat parts) of the bell curve, perhaps using multiples of EBITDA data of relevant peer companies.

Figure 6B:
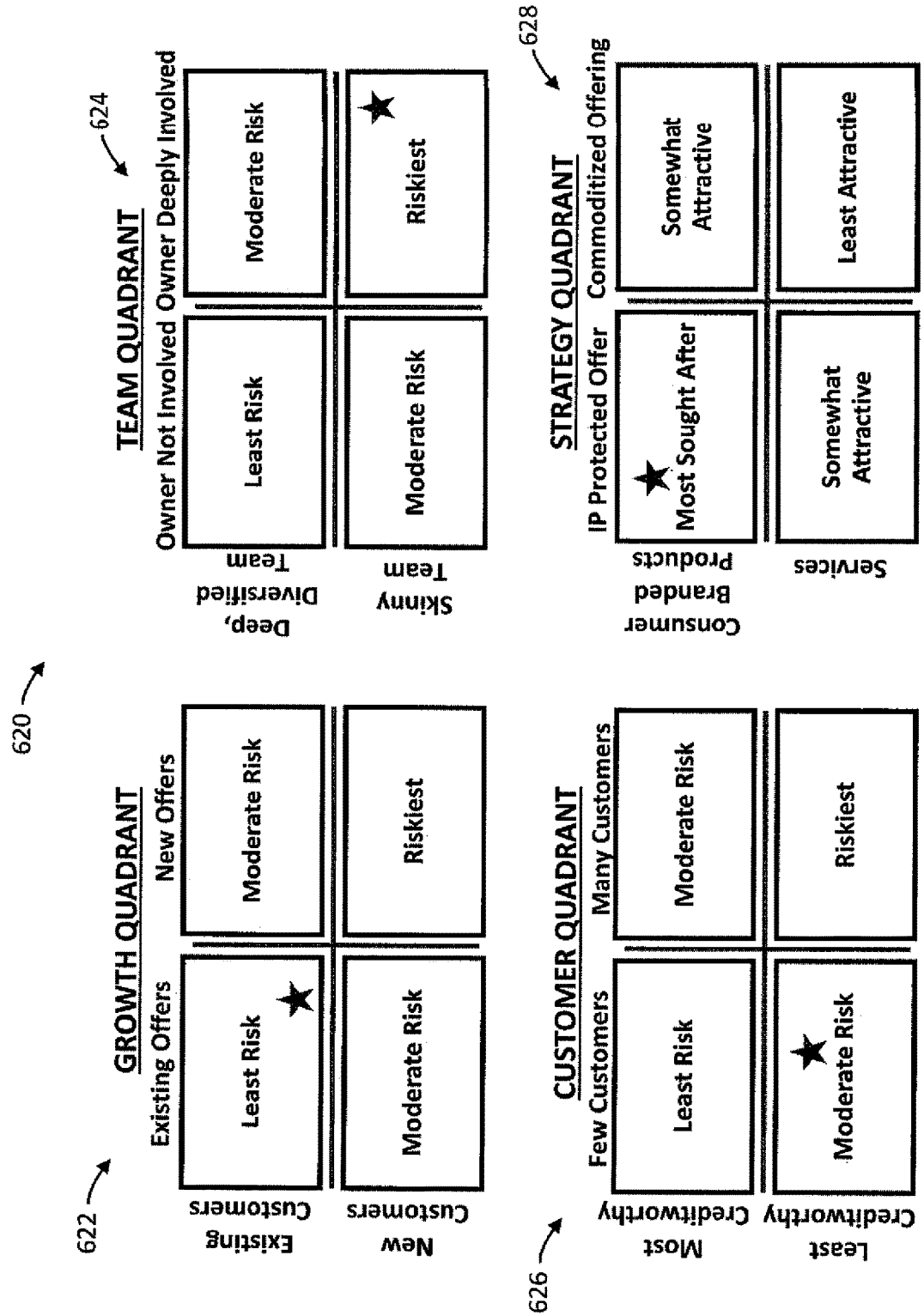
FIG. 6B depicts a display of quadrant scoring as provided to a user on the user interface of FIG. 1.

Other displays or representations of the various business metrics generated by the logic engine of the system are possible, such as a display of composite or total weighted scores of grouped collections of business questions, and a quadrant scoring display, as depicted in FIG. 6B.

At element 384, other comparisons of user-provided data (the user input 210) may be presented against peer businesses. For example, benchmarking ratios of the subject company relative to peer companies may be generated and presented to the user 200.

Figure 4:
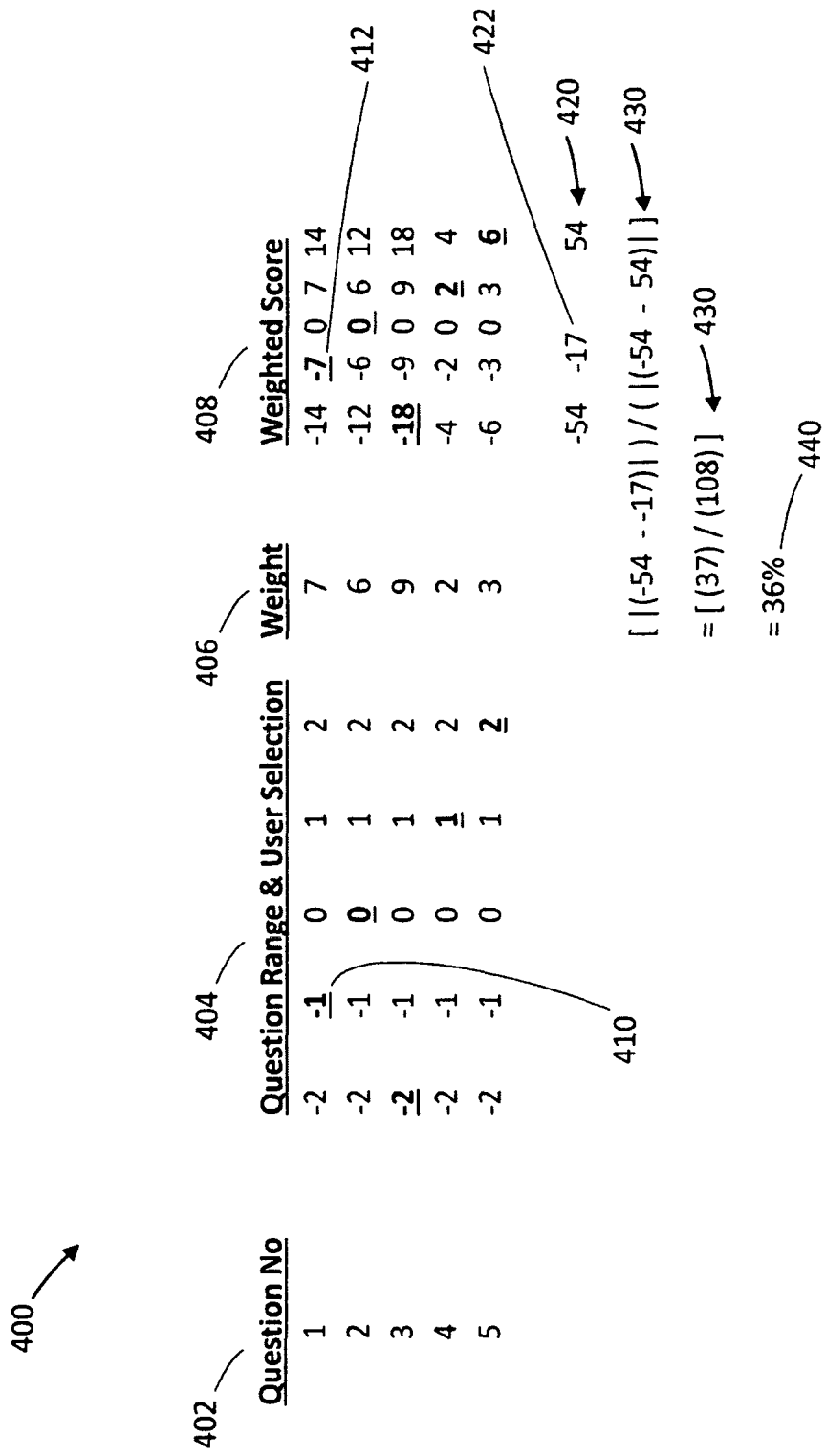
FIG. 4 is a sample set of calculations of the logic engine element of FIG. 1.

Lastly, at element 386, a user 200 may select data elements to send to third parties. For example, a user 200 may request that all questions/responses, and associated generated data, in the "growth potential" collection (see FIG. 6A), be shared with a particular institutional investor. FIG. 4 is a sample set of calculations of the logic engine element of FIG. 1. Generally, a set of questions 402, each with a question range and user selection 404, receive a user response. Each question has a weight 406, which yields a weighted score 408. The total of the weighted scores are considered against the total range of the weighted scores as summation calculation 420. An absolute value calculation 430 is performed with respect to the summation calculation 420, so as to generate a summary metric 440.

The sample set of calculations of FIG. 4 present five (5) questions 402 for brevity. The range of responses are five (5) tranches of answers that would have scores of −2, −1, 0, 1, and 2. The user may select one of the five values directly (i.e. may select one of 5 answers that would have scores of −2, −1, 0, 1, 2) or may select from one of five possible answers that is matched to one of the five tranches. With respect to question 1, the user has selected the answer that has a score of "−1", identified as the underlined number of element 410 in FIG. 4. The weight 406 of question 1 has been predetermined to be 7. Thus, the weighted score range of question 1 is established by multiplying each of the tranches by 7, to yield −14, −7, 0, 7, and 14, as shown in the first row of the weighted score 408 column. (Similar calculations may be performed for the remaining four question rows, e.g. question 2, with a weight 406 of 6, yields a weighted score range of −12, −6, 0, 6, and 12). Returning to question 1 calculations, the user response 410 of "−1" maps to a weighted score of −7, as shown as the underlined number of element 412. Such a process of determining a weighted score and a weighted score range is performed for each of the five questions. Each user response is depicted as a bold underline in the column user selection 404, with respective weighed score depicted as a bold underline in the weighted score 408 column.

The range of the total weighed scores of the set of five questions is then determined, along with the total of the five weighted scores (show as summation calculation 420). More specifically, the lower range is determined by adding the lower values of each of the five weighted score ranges, i.e. adding the value is −14, −12, −18, −4, and −6 to yield −54. Similarly, the upper range is calculated as 54. The total of the five weighted scores is calculated by adding the five weighted scores, i.e. by performing the calculation of −7+0+−18+2+6 to yield a total weighted score 422 of −17.

A summary metric 440 is then determined by dividing the absolute value of the absolute value calculation 430 with respect to the summation calculation 420, so as to generate a summary metric 440. In the example of FIG. 4, the absolute value of the lower bound of the weighted score range (i.e. −54) less the total weighted score 422 (i.e. −17) yields 37, and the range of the total weighed scores yields 108. (See absolute value calculation 430). The result of the absolute value calculation 430 is the summary metric 440, i.e. 36%.

Figure 5:
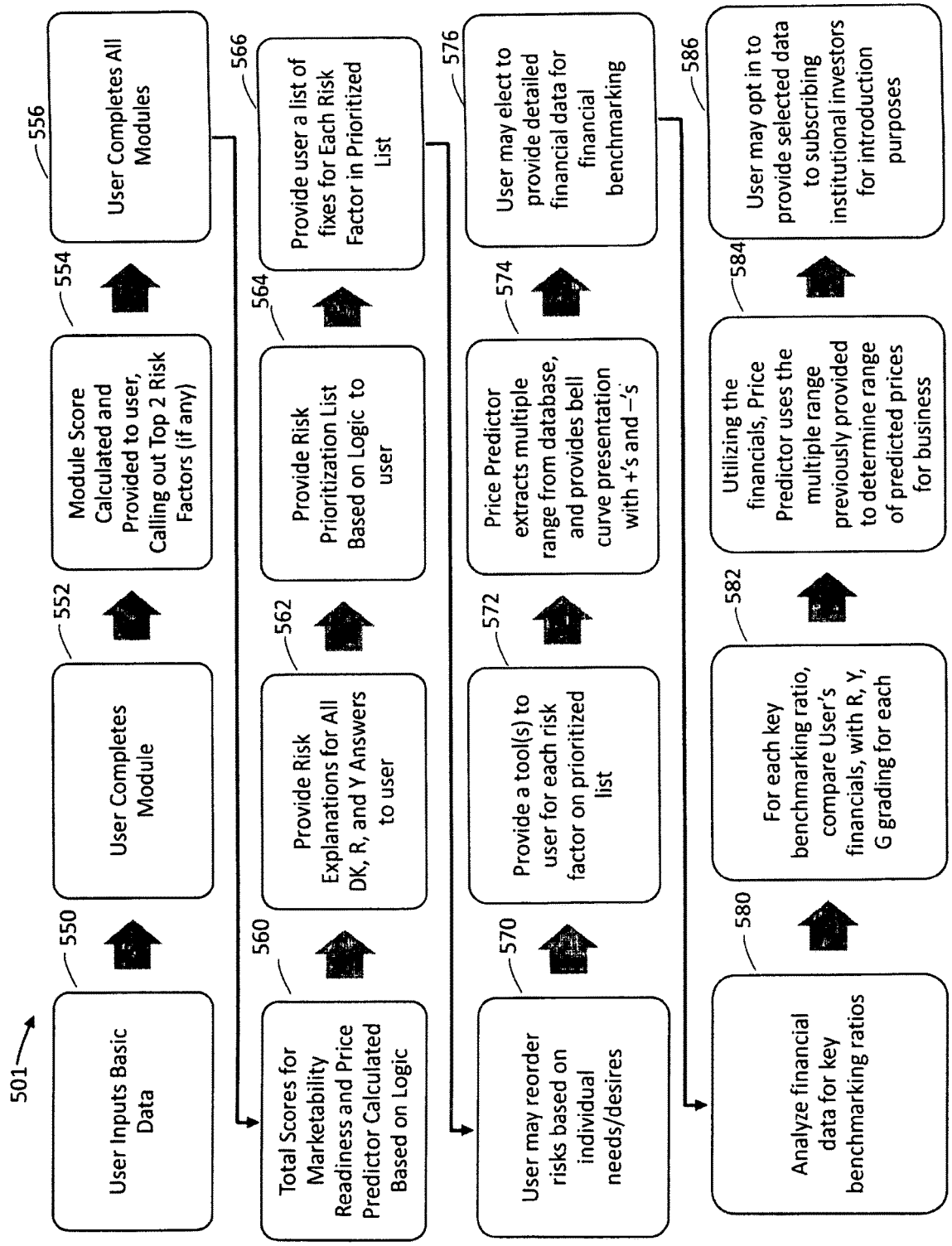
FIG. 5 is a flow diagram of one method of use of the business risk and business valuation system of FIG. 1 from a user perspective.

FIG. 5 provides a flow diagram of one method of use of the business risk and business valuation system 100 by a user 200. Note that in some embodiments, some functions (e.g. any of the identified elements numbered 550-586) may be absent, occur in a different order, or include other functions or steps not shown.

A method of use 501 depicted in FIG. 5 will now be described, with reference to aspects and features of the system of FIG. 1 described above with respect to FIGS. 2-4. The user 200 interacts with the logic engine 300 of the system 100 by way of the user interface 210. Stated another way, the user 200 provides user inputs 210 by way of user interface 210 and receives logic engine outputs 220 by way of user interface 210. Many of the elements of FIG. 5 are similar to those of FIG. 3.

At element 550, the user 200 enters the basic data, as described in FIG. 2, and the system receives the basic data. At element 552, the user 200 completes the first of a set of question modules, and the system receives the set of user-provided answers. As described above, in one embodiment, the system 100 categories the set of business queries into seven modules.

At element 554, a module score is calculated, and, if appropriate, a set of top risk factors (e.g. top two risk factors) are identified and presented to the user. At element 556, the user 200 steps through the remaining modules. (After each module is completed, a set of top risk factors may be presented to the user 200.) Similar to element 362 of FIG. 3, at element 560 a total score for each of market readiness and price predictor are provided to the user. (Note that the total scores are calculated through the process described above with respect to FIG. 3 and are not described here for brevity. Similarly, other steps of the logic engine 300 are not described for brevity.) Element 562 is similar to element 372 of FIG. 3, except that risk explanations are also provided for yellow answers in addition to deal killer (i.e. red) answers. Element 564 is similar to element 374 of FIG. 3 wherein a risk prioritization list is presented to the user 200. At element 566, a list of risk fixes is provided for each risk in the risk prioritization list generated at element 564.

The user 200 may interact with the business risk and business valuation system 100 at any of several steps of logic engine 300 operation. For example, the user may interrupt the notional sequence of the logic engine 300 (as described above with respect to FIG. 3), to reorder identified business risks (as provided at element 566.) The user 200 may so reorder based on any of several reasons, to include expert knowledge, tuning or adjustment of relative risks to reflect a targeted investor, and the like.

At element 572, a further tool may be provided to the user to investigate a particular risk factor. For example, the tool may provide externally-sourced benchmark data from peer companies related to questions that triggered the particular risk factor, to enable the user 200 to obtain a deeper understanding of the origin or significance of the risk factor.

Element 574 is similar to element 382 of FIG. 3, wherein a price predictor graph is generated. The price predictor graph may present a range of business value as a bell curve with one or both of positive and negative attributes illustrated, as described above. At element 576, the user 200 may provide additional detailed data, such as financial data, to enable peer company benchmarking, such as financial benchmarking. At element 580, the user 200 may interact with the logic engine 300 to analyze key benchmarking ratios. Alternatively, or additionally, the logic engine 300 may automatically analyze key benchmarking ratios.

At element 582, the user-provided financial data are compared with benchmarking ratios, and qualitative grading (e.g. red, yellow, and green) is provided. At element 584, the logic engine 300 determines a range of predicted prices for the subject business, as influenced by the financial data provided by the user 200 at element 576. Lastly, at element 586, similar to element 386 of FIG. 3B, the user 200 may select data elements to send to third parties.

FIGS. 6A-B depict various displays provided to a user 200 by way of the user interface 310. Note that one or more analog displays for measures of marketability and price predictor may be presented (not shown), similar to analog speedometer or bar chart displays. FIG. 6A has been discussed above relative to FIG. 3, wherein a risk prioritization list is generated, the list presenting the risks (aka risk factors) from most important to least important for each business category.

FIG. 6B presents four business query modules in quadrant analysis 620 format. Specifically, sample score positions for a company in the growth module 622, team module 624, customer module 626, and strategy module 628, are depicted. In one embodiment, a user may receive more detailed information as to a particular quadrant, e.g. an explanation as to the importance of a particular quadrant, through interaction (e.g. point and click) with the particular quadrant.

Figure 7:
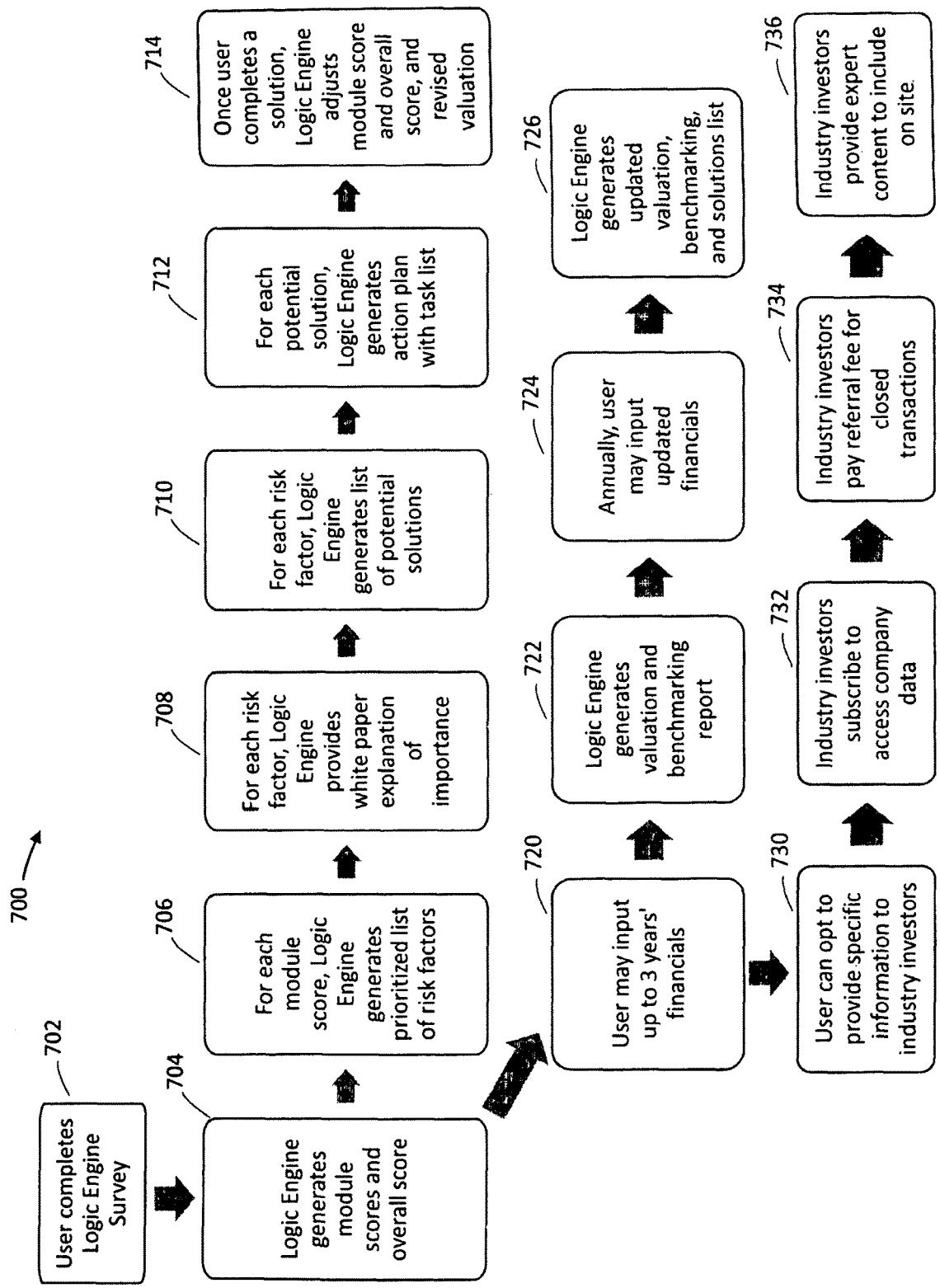
FIG. 7 provides a flow diagram of another method of use of the business risk and business valuation system of FIG. 1.

FIG. 7 depicts an extended flow diagram 700 of the business risk and business valuation system 100 of FIG. 1 as employed by a user 200 over an extended period, such as over several years, and as part of an interactive valuation action plan.

Elements 702 through 714 of the extended flow diagram 700 depict the operation of the business risk and business valuation system wherein a user 200 interacts with the system to improve business valuation. More specifically, the user 200 works off an action plan with task lists (element 712) that address or mitigate prioritized risk factors (element 706), applying one or more potential solutions (element 710). The system 100 is rerun as the tasks are completed (and resulting new data input) so as to generate a revised valuation (see element 714).

Elements 720 through 726 of the extended flow diagram 700 depict a user 200 interacting with the system 100 over a several year period (as shown here in FIG. 7, over a three-year period; other periods may be considered in other embodiments) so as to generate and monitor valuation, benchmarking, and a solutions list (element 726) on an annual basis. In some embodiments, the range of years to consider is user selectable, i.e. a user may select a ten-year period, a five-year period, etc.

Elements 730-736 of the extended flow diagram 700 depict an extension of the system capability to provide selected system data to targeted third parties, as described above. As depicted in FIG. 7, a user may opt to provide selected data to targeted third parties, such as to identified industry investors (see element 730). The targeted third parties may elect to subscribe to the selected data (see element 732), may provide a referral fee for such access (see element 734), and/or may provide expert content (see element 736).

FIG. 8A depicts a sample data file 801 associated with the user input element of the business risk and business valuation system 100 of FIG. 1. Specifically, a set of two questions (column 814), both assigned to the market module (column 812), are presented. Each question is associated with a risk factor/risk name (column 816) and assigned to either value/price or marketability (column 815). Each question may also be assigned a submodule (column 813). A trigger value (column 817) for output by the logic engine 300 of a white paper is provided. Each user answer is assigned an initial score (column 820). Each question has a weighting value (column 830) and an associated weighting decile value (column 832). Maximum ranges (columns 840) are also provided.

Figure 8B:
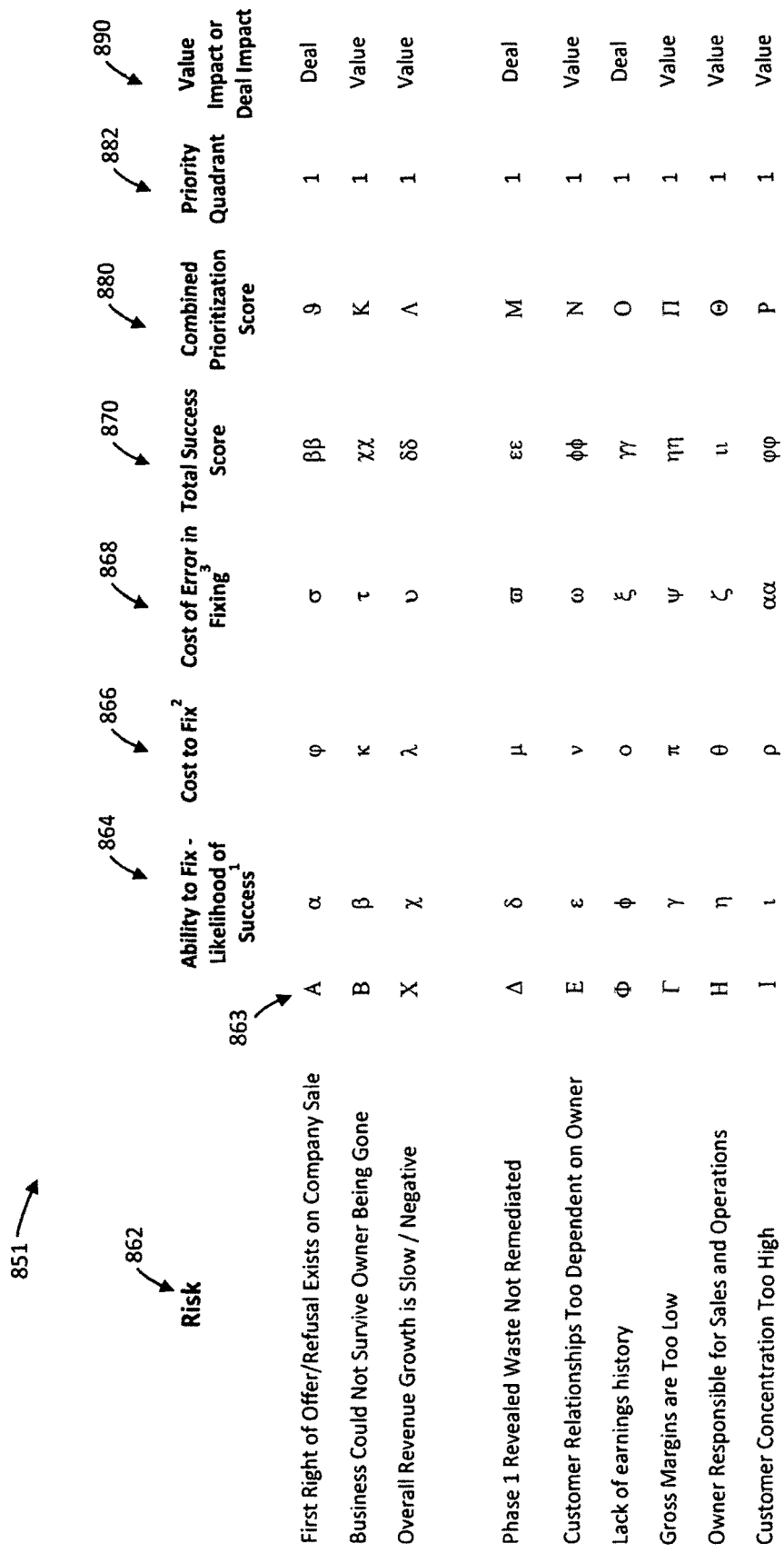
FIG. 8B is a data file associated with the risk prioritization aspect of the business risk and business valuation system of FIG. 1.

FIG. 8B depicts a sample data file 851 associated with the risk prioritization aspect of the business risk and business valuation system 100 of FIG. 1. Specifically, a set of risks are identified (column 862), each risk with an identifier (column 863), an ability to fix value (column 864), a cost to fix (column 866), and a cost of error in fixing (column 868). Also, a total success score (column 870) is provided, a combined prioritization score (column 880), a priority quadrant 882, and a designation as value impact or deal impact (column 890). Column 870 is the summation of columns 864, 866, and 868.

In one embodiment, the number of queries of a user is about 120 in number. In one embodiment, the number of queries of a user is more than 120 in number. In one embodiment, the number of queries of a user is less than 130 in number. In one preferred embodiment, the number of queries of a user is between 100 and 140. In a more preferred embodiment, the number of queries of a user is between 100 and 130.

In one embodiment, the number of user-provided answers of a user is about 120 in number. In one embodiment, the number of user-provided answers is more than 120 in number. In one embodiment, the number of user-provided answers is less than 130 in number. In one preferred embodiment, the number of user-provided answers is between 100 and 140. In a more preferred embodiment, the number of user-provided answers is between 100 and 130.

In other embodiments, the business risk and business valuation system described is applied to personal financial planning rather than the above-described company/business planning. For example, the system may assist a user with determining how ready the owner is to sell their company, the maturity or appropriateness of estate planning, financial planning, tax planning, and liability planning.

The exemplary systems and methods of this disclosure have been described in relation to predicting business valuation and business risk. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements.

These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for automatically calculating an interactive business valuation score relative to peer companies using qualitative business transaction risk data, the method comprising:

receiving, by a graphical user interface (GUI) of a logic engine executing on a processor of a computer system, a plurality of user-provided answers to a set of business queries;

quantizing, by the logic engine, each of the user-provided answers within a set of tranches to generate a plurality of quantized user-provided answers;

accessing, by the logic engine, a data storage device having a non-transitory computer-readable storage medium storing a plurality of qualitative business transaction risk data associated with the set of business queries, the plurality of qualitative business transaction risk data comprising a set of risk factors;

automatically calculating, by the logic engine, a plurality of quantized weighted answer values associated with the plurality of quantized user-provided answers and the set of risk factors;

searching, by the logic engine, the data storage device to map each of the quantized weighted answer values to one or more qualitative business transaction risk data stored on the data storage device to identify a plurality of identified business transaction risks;

ranking, by the logic engine, the plurality of identified business transaction risks to automatically generate a risk prioritization list, the ranking based at least on a set of identified qualitative business transaction risk data associated with each identified business transaction risk;

rendering, by the GUI of the logic engine, the risk prioritization list;

automatically calculating, by the logic engine, a business valuation score based at least on: i) the risk prioritization list, and ii) the set of identified qualitative business transaction risk data associated with each identified business transaction risk;

rendering, by the GUI of the logic engine, the business valuation score relative to peer companies on a price prediction graph;

receiving, by the GUI of the logic engine, a re-ordering of the identified business transaction risks of the risk prioritization list to create a revised risk prioritization list;

automatically re-calculating, by the logic engine, the business valuation score using the revised risk prioritization list to generate a revised business valuation score; and rendering, by the GUI of the logic engine, the revised business valuation score relative to peer companies on a revised price prediction graph.

2. The method of claim 1, wherein:
the price prediction graph is a bell curve automatically calculated, by the logic engine, at least using the plurality of qualitative business transaction risk data stored in the data storage device and the plurality of quantized user-provided answers.

3. The method of claim 1, wherein the set of tranches are at least a set of five tranches.

4. The method of claim 1, wherein the set of risk factors are at least a set of four risk factors.

5. The method of claim 4, wherein the set of four risk factors include at least two of the following four risk factors associated with: importance to deal value, cost to fix, ability to fix, and risk to fix.

6. The method of claim 1, further comprising the step of, after calculating the business valuation score, updating the plurality of qualitative business transaction risk data stored in the data storage device based on the plurality of quantized user-provided answers.

7. The method of claim 1, wherein the set of business queries includes at least four business queries associated with: geographic markets, cyclicality, manufacturing, owner dependence, products-services, depth-quality, owner dependence, unionization, and market position.

8. The method of claim 1, further comprising the step of generating, by the logic engine, a listing of potential fixes for a particular identified business transaction risk, the particular identified business transaction risk selected by a user by way of the GUI, the listing of potential fixes based at least on the qualitative business transaction risk data and the plurality of quantized user-provided answers.

9. The method of claim 1, wherein the tranches map to numeric integer values.

10. The method of claim 1, wherein:
the data storage device is a remote data storage device at least partly implemented on the cloud; and
the GUI is associated with a user app.

11. A method of automatically calculating an interactive business valuation score relative to peer companies using qualitative business transaction risk data, the method comprising:
receiving, by a graphical user interface (GUI) of a logic engine executing on a processor of a computer system, a plurality of user-provided answers to a set of business queries;
quantizing, by the logic engine, each of the user-provided answers within a set of tranches to generate a plurality of quantized user-provided answers, the tranches mapping to numeric integer values;
accessing, by the logic engine, a data storage device having a non-transitory computer-readable storage medium storing a plurality of qualitative business transaction risk data associated with the set of business queries, the plurality of qualitative business transaction risk data comprising a set of risk factors;
automatically calculating, by the logic engine, a plurality of quantized weighted answer values associated with the plurality of quantized user-provided answers and the set of risk factors;
searching, by the logic engine, the data storage device to map each of the quantized weighted answer values to one or more qualitative business transaction risk data stored on the data storage device to identify a plurality of identified business transaction risks;
ranking, by the logic engine, the plurality of identified business transaction risks to automatically generate a risk prioritization list, the ranking based at least on a set of identified qualitative business transaction risk data associated with each identified business transaction risk;
rendering, by the GUI of the logic engine, the risk prioritization list;
automatically calculating, by the logic engine, a business valuation score based at least on: i) the risk prioritization list, and ii) the set of identified qualitative business transaction risk data associated with each identified business transaction risk;
rendering, by the GUI of the logic engine, the business valuation score relative to peer companies on a price prediction graph;
updating the plurality of qualitative business transaction risk data stored in the data storage device based on the plurality of quantized user-provided answers;
generating, by the logic engine, a listing of potential fixes for a particular identified business transaction risk, the particular identified business transaction risk selected by a user by way of the GUI, the listing of potential fixes based at least on the qualitative business transaction risk data and the plurality of quantized user-provided answers;
receiving, by the GUI of the logic engine, a re-ordering of the identified business transaction risks of the risk prioritization list to create a revised risk prioritization list;
automatically re-calculating, by the logic engine, the business valuation score using the revised risk prioritization list to generate a revised business valuation score; and
rendering, by the GUI of the logic engine, the revised business valuation score relative to peer companies on a revised price prediction graph.

12. The method of claim 11, wherein:
the data storage device is a remote data storage device at least partly implemented on the cloud; and
the GUI is associated with a user app.

13. A system for automatically calculating an interactive business valuation score relative to peer companies using qualitative business transaction risk data, the system comprising:
a logic engine comprising a computer processor;
a graphical user interface (GUI) associated with the logic engine and executing on the computer processor, the GUI configured to receive a plurality of user-provided answers to a set of business queries;
a data storage device having a non-transitory computer-readable storage medium, the data storage device storing a plurality of qualitative business transaction risk data associated with the set of business queries, the plurality of qualitative business transaction risk data comprising a set of risk factors;
wherein:
the logic engine has machine-executable instructions operating to:
quantize each of the user-provided answers within a set of tranches to generate a plurality of quantized user-provided answers;
automatically calculate a plurality of quantized weighted answer values associated with the plurality of quantized user-provided answers and the set of risk factors;
search the data storage device to map each of the quantized weighted answer values to one or more qualitative business transaction risk data stored on the data storage device to identify a plurality of identified business transaction risks;

rank the plurality of identified business transaction risks to automatically generate a risk prioritization list, the ranking based at least on a set of identified qualitative business transaction risk data associated with each identified business transaction risk;

render, by the GUI, the risk prioritization list;

automatically calculate a business valuation score based at least on: i) the risk prioritization list, and ii) the set of identified qualitative business transaction risk data associated with each identified business transaction risk;

render, by the GUI of the logic engine, the business valuation score relative to peer companies on a price prediction graph;

receive, by the GUI of the logic engine, a re-ordering of the identified business transaction risks of the risk prioritization list to create a revised risk prioritization list;

automatically re-calculate the business valuation score using the revised risk prioritization list to generate a revised business valuation score; and render, by the GUI of the logic engine, the revised business valuation score relative to peer companies on a revised price prediction graph.

14. The system of claim 13, the data storage device is a remote data storage device at least partly implemented on the cloud; and the GUI is associated with a user app.

15. The system of claim 13, wherein the price prediction graph is a bell curve automatically calculated, by the logic engine, at least using the plurality of qualitative business transaction risk data stored in the data storage device and the plurality of quantized user-provided answers.

16. The system of claim 13, wherein the set of business queries includes at least four business queries associated with: geographic markets, cyclicality, manufacturing, owner dependence, products-services, depth-quality, owner dependence, unionization, and market position.

17. The system of claim 13, wherein the logic engine further comprises machine-executable instructions operating to: update the plurality of qualitative business transaction risk data stored in the data storage device based on the plurality of quantized user-provided answers.

18. The system of claim 13, wherein the logic engine further comprises machine-executable instructions operating to: generate a listing of potential fixes for a particular identified business transaction risk, the particular identified business transaction risk selected by a user by way of the GUI, the listing of potential fixes based at least on the qualitative business transaction risk data and the plurality of quantized user-provided answers.

19. The system of claim 13, wherein the set of risk factors include at least two of the following risk factors associated with: importance to deal value, cost to fix, ability to fix, and risk to fix.

20. The system of claim 13, wherein the tranches map to numeric integer values.

* * * * *